No. 864,237. PATENTED AUG. 27, 1907.
B. A. FISKE.
RANGE FINDER.
APPLICATION FILED MAY 22, 1906.
3 SHEETS—SHEET 1.
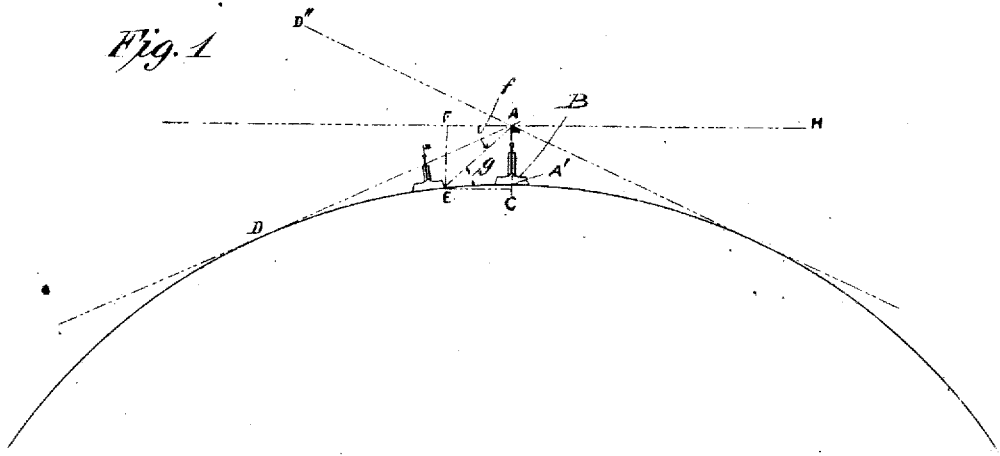
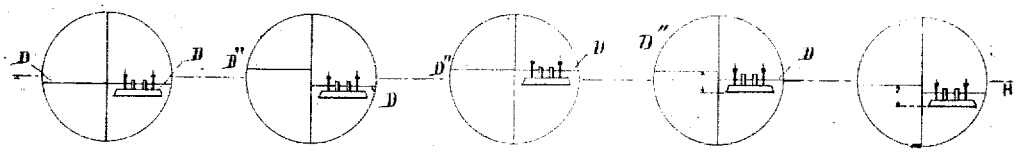
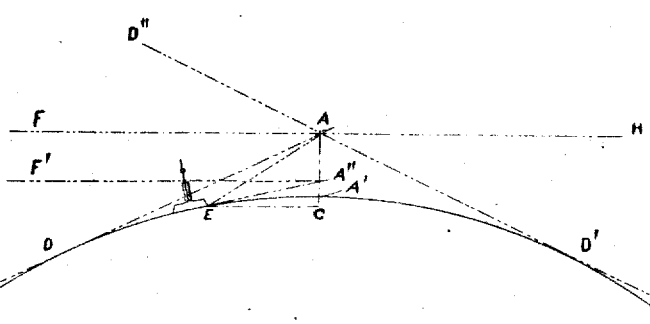
Witnesses:
Inventor
Bradley A. Fiske
Attorneys.

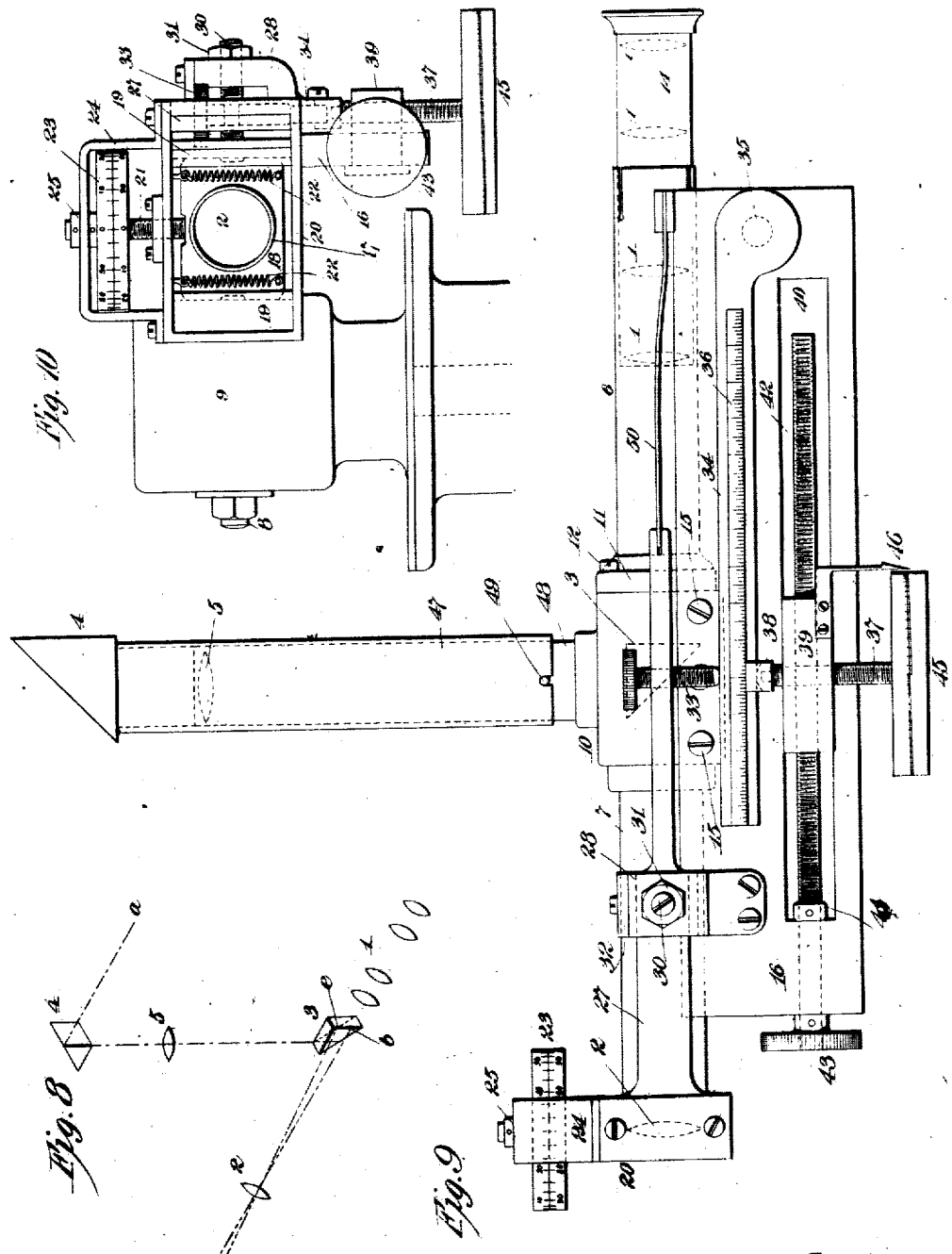

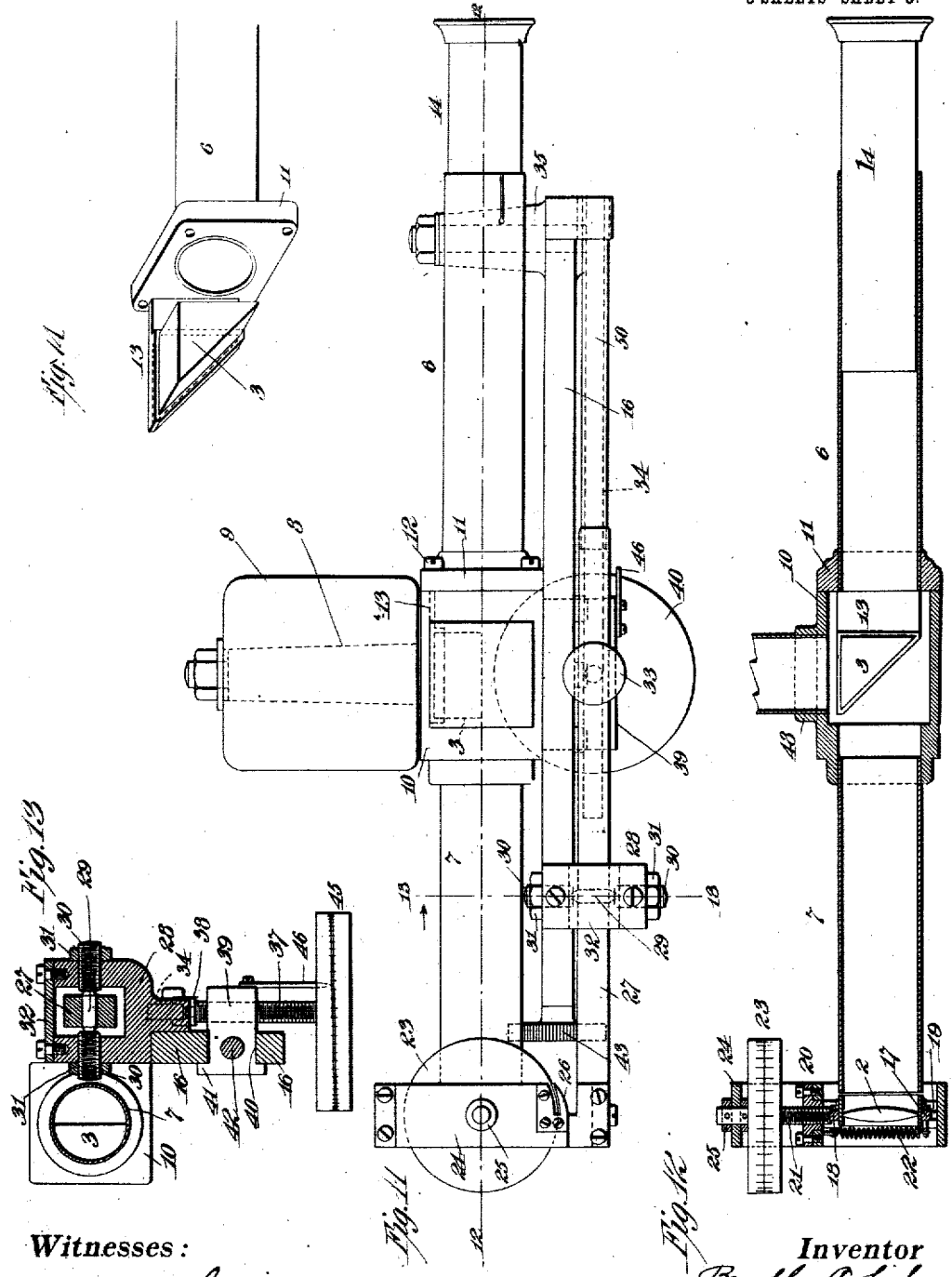

UNITED STATES PATENT OFFICE.

BRADLEY A. FISKE, OF THE UNITED STATES NAVY, ASSIGNOR TO WESTERN ELECTRIC COMPANY, OF CHICAGO, ILLINOIS, A CORPORATION OF ILLINOIS.

RANGE-FINDER.

No. 864,237.    Specification of Letters Patent.    Patented Aug. 27, 1907.

Application filed May 22, 1906. Serial No. 318,140.

*To all whom it may concern:*

Be it known that I, BRADLEY ALLEN FISKE, of the United States Navy, a citizen of the United States, and a resident of New York city, New York, have invented a certain new and useful Improvement in Range-Finders, of which the following is a description.

The object I have in view is the production of a range finder which will be extremely accurate, and readily operated, and which will give readings of the distances, without need of calculation.

In my Patent 523,721, granted July 31st, 1895, which described what is known as the stadimeter, and which is in use in the United States Navy, I disclosed a device for measuring distances when the vertical height (the mast height) of the target is known to the observer. The stadimeter operates upon the principle of the sextant, the light rays from the top and base of the target being received, one by direct observation and the other reflected by two mirrors, which are carried one upon the frame and the other upon the index bar. The reflected image is brought to coincide with the direct image by moving the index bar, by means of a micrometer screw, which carries a graduated wheel, by means of which a direct reading of the range may be taken off. The position of the screw is adjustable, to accord with the estimated mast height.

The use of the stadimeter for the purpose of a range finder is open to the objection that the mast height of the target must be known to the observer. By the present invention, this objection is overcome, the vertical side of the triangle used being the observer's own height, which can be easily ascertained. The new instrument is a modification of the stadimeter, and has been denominated by me the horizometer.

In order to completely understand the nature of the invention, attention is directed to the accompanying drawings, in which Figure 1 is a diagrammatic view to illustrate the principle involved in the invention. Figs. 2, 3, 4, 5 and 6 are different views of the images appearing to the observer during different stages of making the observation. Fig. 7 is a diagrammatic view illustrating the calculation for determining more exactly the length of the vertical side of the triangle. Fig. 8 is a diagrammatic view illustrating the location of the lenses and prisms. Fig. 9 is a side view of one form of apparatus embodying my invention. Fig. 10 is an end view thereof. Fig. 11 is a top view. Fig. 12 is a longitudinal section taken on the line 12—12 of Fig. 11. Fig. 13 is a transverse section on the line 13—13 of Fig. 12: and Fig. 14 is a perspective view of the inner end of the eye-piece, showing mounting for the prism carried thereby.

In all the views, like parts are designated by the same reference characters.

In Fig. 1, B represents the vessel upon which the observer is stationed when using the horizometer; E represents the water line of the target, the line A A' represents the mast height. In using the stadimeter, the range would be measured from E to A', the observer standing near E and alining A and A', the side A A' the mast height, being known or estimated by the observer at E; the range being indicated on the graduated micrometer wheel, which is marked in units of distance. Or, if he knew A C and could see C, he would aline A and C.

By my present invention, the observer will stand at A, the instrument, being set at the height A C; and he will aline a vertically displaced image of E with an image of the front or the rear horizon, thereby revolving the line A E through an angle equal to F A E=A E C. The angle F A E is called "the angle of depression". In Figs. 1 and 7, let D E A' D' represent the earth's surface, A the position of the observer, D the horizon of A, D' the rear horizon of A, A D'' the prolongation of A D', E the water line of the target whose distance is desired and A'' a point on A A' in whose horizon E is. Let A'' F' be a true horizontal line drawn from A''. The apparatus is arranged so that simultaneous sights can be taken of the front and rear horizons of the observer. The observer looks directly along the line A D, and looks by reflection along the line A D''; the rays of light on this line being reflected through a prism to the eye-piece of the telescope so that the observer sees A D' in the line A D''; that is, in looking through the apparatus, the observer sees the back horizon apparently along the line A D''. The angle D'' A D is clearly twice the angle F A D, which (F A D) is called the angle of "dip", and is the angle between the true horizontal line A F, and the apparent horizon of the observer. The instrument being set at the height A C, the problem therefore is to obtain a measure of the "angle of depression", F A E, which is of course equal to its alternate angle A E C. This is accomplished by throwing a vertically displaced image of E and an image of the rear or front horizon on to the same focal plane, which focal plane is common to two object glasses, one of which object glasses receives rays direct from E, while the other receives the reflected rays from the front or the rear horizon; and then measuring the distance apart of the two images, by measuring the movement necessary to aline them. The alinement is made by moving one of the object glasses parallel to itself, thereby moving it equal distance along its focal plane the image it forms. If it is found that the object glass must be moved—say 1/100 inch, in order to aline the two images, and if the focal length of each object glass equals 5.15 inches, (as is the case in one instrument already constructed) then the angle through which the rays coming through that object glass have been thus displaced must be the angle whose tangent $= \frac{.01}{5.15}$ which is an angle of somewhat less than 7 minutes. As rays of light coming through an object glass converge to foci along their original directions, it is clear that the angular displacement of the two images is equal to the angle between the objects whose images are formed on the focal plane, supposing the instrument to be properly adjusted before using. By this means the angle between two objects if it be quite small, can be measured by measuring the distance through which it is necessary to move one object glass, in order to aline the images of those two objects. If, for instance, in Fig. 8, the line $a\, 4\, 5\, 3\, b$ indicates a bundle of rays coming from a distant object behind the observer, and the line $c\, 2\, 3\, b$, parallel to $a\, 4\, 5\, 3\, b$ indicates rays coming from a distant object in front of the observer, and if the prisms 4 and 3 be placed with their reflecting surfaces perpendicular to each other and the lenses 2 and 5 placed with their axes of collimation along the lines $a\, 4\, 5\, 3\, b$ and $c\, 2\, 3\, b$, and the lenses at the distances of their focal length from the plane of the rear edge of the prism 3, then the images of the rear and front objects will be alined at $b$ in the plane of the rear surface of the prism 3, where they can be viewed by the eye-piece. If now rays from another distant object come along the line $d\, 2\, 3\, e$, those rays will form an image at $e$; and as the angle $e\, 2\, b = c\, 2\, d$, and as the angle $e\, 2\, b$ is the angle whose tangent is $\frac{eb}{e2}$, it is plain that, if we measure the distance $eb$ and know the focal length $e\, 2$, we can find at once the angle $c\, 2\, d$. It is also plain that the distance $eb$ can be easily measured, if we move the lens 2 parallel to itself until the image it forms is moved from $e$ to $b$, and we then measure the distance the lens 2 is moved, which distance is, of course, equal to $eb$, the distance between the two images. It is also plain that if the rays $c\, 2$ and $d\, 2$ come from say the bottom and top of a mast whose height $= h$ is known, then, letting D equal its distance from 2, D : $h$ = focal length : movement of lens,
D = $h \times$ focal length of lens / movement of lens.

As the focal length of the lens is known, and as the movement of the lens can be measured, it is plain that, if $h$ be known, the distance D can be determined by the same operation as in using the stadimeter, and the micrometer graduated in units of distance. If we refer now to Figs. 1 and 7, it will become plain that an observer at A can by this means measure the "angle of depression", F A E, if he can aline E with some image on the horizontal line A F; thereby revolving the line A E through the angle F A E; and also that he can determine the distance A E if he knows in addition the length of the line A C. It is also plain that he can accomplish the same result if he alines E with some point on A D or A D'', provided he displaces the image of E by an angular amount equal to the angle of A D below the line A F, or of A D'' above the line A F. In other words, by this instrument an observer can measure the distance A E either from A or from E. The mechanism by means of which this is accomplished is shown in Figs. 8 to 14 inclusive. In Fig. 8, 1 represents the eye-piece lens; 2 is one of the two object glasses, 3 is a prism, which covers one-half the field of the eye-piece in a horizontal plane and reflects rays from the prism 4 into the eye-piece; 4 is a prism arranged to reflect the rays from the front or back of the observer to the prism 3; 5, is the other object glass, and it is arranged between the two prisms, and so placed that the rear of edge of prism 3 is in its focal plane. As shown in Fig. 8, an image formed by the lens 2 will appear directly upon the focal plane, and be observed through the eye-piece lens; and at the same time rays of light from the rear will be reflected through the prisms 4 and 3, and an image will be formed by the object glass 5, which image will be on the same focal plane; each image will occupy one-half the focal plane, and the observer will see both at the same time, the two images being separated by a vertical line, which is the rear vertical edge of prism 3. Means are provided for moving the object lens 2, so that the different angles $e\, 2\, b$ (Fig. 8) may be measured.

In the preferred embodiment of the invention, the lenses and prisms illustrated in Fig. 8 are supported upon or within a central member, 10, and two tubes, 6 and 7. The central member 10 is provided with a horizontal pivot 8 so as to be movable in a vertical plane on the support 9, which in turn is capable of being swung horizontally on its vertical pivot which is fitted on a suitable standard or pillar of a height convenient to the operator. The instrument may therefore be turned to any angle of the azimuth or altitude. The tube 6 is secured to the central member by having a flange 11 formed upon it, which flange is secured by screws 12 to the central member. This flange 11 carries upon it an arm 13, to which the prism 3 is rigidly secured. The arm 13 is provided with raised edges which form a retaining wall or support for the prism 3. By this means the prism is held in place, immovably in relation to the tube 6. The other end of the tube 6 serves as a support for the tube 14, which slides within it and carries the eye-piece lens 1. The tube 14 is slidable within the tube 6 in the usual manner, so that the observer may bring the image to the point of clearest definition.

Attached to the central member 10 by any suitable means, as by the screws 15, is a frame 16. This frame 16 extends below the tubes 6 and 7, and has a long longitudinal opening 40. It is provided with means for supporting and adjusting the position of the lens 2. The lens 2 is carried within a short length of tube 17 (see Fig. 12) which tube is mounted in a frame 18 (see Fig. 10). This frame slides within ways 19, in a frame 20. The ways 19 are vertical so that the frame 18 may move up and down in a vertical direction. This movement is obtained by means of a micrometer screw 21, which passes through a nut carried by the frame 20, its lower end engaging with the frame 18. The frame 18 is elevated and held in engagement with the screw by means of two springs 22, one on each side of the screw. The micrometer screw 21 is provided with an adjusting wheel 23, which is divided into divisions of angular measurements, as will be explained. The frame 20 carries a supplemental frame 24, which extends over the top of the micrometer wheel 23, and carries a bearing 25 for the upper end of the screw. This frame 24 also carries an index finger 26 (see Fig. 11). This finger is adapted to register with the divisions of the micrometer wheel 23.

The frame 20 is carried upon an arm 27, which is pivoted to the frame 16. The details of this pivot are best shown in Fig. 13. A support 28 is secured by suitable means, such as by screws, to the fitting 16. This support has a central opening through which the arm 27 passes. The arm 27 is provided with a pin 29 having pointed extremities which engage in bearings in the inner ends of the bolts 30, which are supported upon opposite sides of the arm by the support 28. Lock nuts 31 hold the bolts 30 in place. A strap 32 connects the open upper ends of the support 28, and upon being removed, permits the more ready reaching of the pivot and removal of the arm 27. Near the opposite end of the arm 27 is a screw 33 having a milled head as shown. This screw engages upon the arm 34, which is horizontal, and pivoted at 35 to the frame 16. As shown in Fig. 11, the pivot 35 is of considerable length and passes through a long bearing formed within a standard carried by or formed integral with the frame 16, so that the arm 34 will be rigidly supported. The arm 34 is provided with a scale 36, similar to the stadimeter, the scale indicating feet, which indicates the mast height. The lower face of the arm 34 is in engagement with a micrometer screw 37, which has a follower 38, which rests against the lower face of the arm 36. The screw 37 is carried in a carriage 39, which rests within the central opening 40, in the frame 16. The carriage 39 is provided with a flange 41, which engages with the rear face of the frame 16, so that the carriage 39 will be rigidly held in place. A central screw 42 passes through the carriage 39, and freely turns in the opening 40 in the frame 16. The screw is provided with a wheel 43, and with a collar 44, so that it may be rotated and slide the carriage 39 through the length of the opening 40. The micrometer screw 37 is provided with a head 45, which has lined divisions arranged upon a spiral line of the same pitch as the screw. A fixed finger 46 is carried by the carriage 39 so as to indicate the divisions upon the micrometer wheel. A spring 50 is used to keep the screw 33 constantly in contact with the arm 34, and the arm 34 with the follower 38.

The prism 4 is carried upon a tube 47. This tube is carried on a tube 48 formed upon the central member 10, and the tube 48 carries the object glass 5. The tube 48 is provided with a pin 49 over which rests a notch in the lower end of the tube 48. A similar notch is formed upon the opposite side of the tube 47, so that upon its being lifted from the tube 40, it can be rotated a half revolution and again held in place by the engagement of the notch and pin. The periphery of the micrometer wheel 23 is divided into one hundred equal divisions. Two scales are used, one reading from right to left and the other from left to right. At the point marked 0 both scales are the same. Opposite 10 in one, the other shows 90; opposite 20 in one, the other shows 80, and so on. The upper scale indicates the amount by which the object glass 2 is depressed; the lower scale indicates the amount the object glass is raised, or vice versa. The scale 36 is divided into feet as is the similar scale on the stadimeter. This represents in the horizometer the height of the operator, while in the stadimeter it represents the mast height of the target. The micrometer wheel 45 is divided into yards, and indicates the distance between the observer and the target. The focal planes of the object glasses 2 and 5 are coincident. The eye-piece lens being focused therefore upon this plane, the observer sees both direct and reflected images with equal definiteness (see Figs. 2, 3, 4, 5 and 6).

The operation of the device is as follows: In order to adjust the instrument, the follower 38 is first adjusted on the scale 36 of the arm 34, to the height of the observer. This is accomplished by turning the head 43 and moving the carriage 39 to the desired position. The distance indicated we will first assume to be equal to the line A A'. The length of the line A C may be determined by the calculation to be hereinafter explained. The prism 4 is then directed to the front by turning the tube 47 a half revolution and setting the opposite notch in connection with the pin 49. Upon looking through the eye-piece and focusing it properly, the observer should see images similar to those shown in Fig. 2, and in which if the instrument is correctly adjusted, both direct and reflected horizons appear exactly alined. In the apparatus shown in the drawings, the prism 3 is upon the right side of the instrument as the observer uses it, but owing to the inversion of the images by the eye-piece lens, the image which is seen through the prism appears upon the left side of the field of view and vice versa. The horizons D D'' appear upon both sides of the vertical line separating the two images. If the instrument be not adjusted, and if there is any difference in alinement between the two images of the horizon, this difference can be corrected by means of the screw 33, which will screw up or down the arm 27, and with it the object glass 2; so that both images of the horizon may be alined. The operator then turns the tube 45 half way round so that the vertical side of the prism 4 is to the rear, and is located as is shown in Fig. 9. The images shown in Fig. 3 will then appear. The horizon D at the front will appear as before, below the true horizontal F H; and the horizon D'', being inverted, appears above the true horizontal. The operator will now adjust the adjusting wheel 23 by turning it to the right, and lowering the object glass 2 until the horizon D apparently rises and alines with the horizon D''. The images will be similar to those shown in Fig. 4. It is necessary to lower the object glass in order to get the apparent elevation of the image by reason of the inversion of images by the eye-piece lens. The angular distance that the object glass will have been depressed, will be a measure of the angle D'' A D, as already explained. Obviously the angle D'' A F or F A D is one-half of this angle. Observing the reading upon the upper side of the adjusting wheel 23, the operator now turns it back just one-half of this reading; for example, if the wheel 23 had been turned through 60 divisions, he turns it back thirty divisions. The images will then appear as in Fig. 5; and the horizon D will exactly coincide with the true horizontal F H; that is, in Figs. 1 and 7, the line A D will have been revolved through the angle F A D. The instrument is now adjusted and ready for use. If now the angle D A E is measured, and added to the angle F A D'', which is equal to F A D, the total angle of depression F A E will have been measured. This is done by depressing the object glass again, until the image of the water line of the target E is alined with the image of the rear horizon D'', thus revolving the line A E through the angle F A E. This is shown in Fig. 5, the arrows on the left of the field of view indicating the two horizontal lines which are to be brought into alinement. This alinement is secured by means of the micrometer wheel 45, which through the agency of the arm 34, and arm 27 acting upon the principle of the stadimeter, moves down the object glass 2; and the amount of movement necessary to produce the alinement is shown by the graduations on the micrometer wheel 45 which are in units of distance. In case the front horizon cannot be seen in line with the target, the instrument is turned in some direction in which both front and rear horizons can be seen, and the image of the front horizon adjusted up to the horizontal in the way just described. The instrument is then turned towards the target, and the distance measured, as before, by turning the micrometer 45 until the image of the water line of the target is raised up to the reflected image of the rear horizon D''.

In case the rear horizon cannot be seen opposite the direction of the target, the front and rear horizons are alined in the way just described. The prism 4 is then reversed so that its vertical side is to the front, and the adjusting wheel 23 is turned in the reverse direction until it has raised the object glass 2 a distance equal to one half the distance it was lowered, thus depressing the right image of the front horizon below the left image of the front horizon by an angle equal to F A D. For example if the object glass 2 had been lowered by turning wheel 23, 60 divisions, the observer would raise the glass 2 by turning wheel 23, 30 divisions in the opposite direction; and the images seen in Fig. 6 would appear. In order thereafter to measure the angle F A E it is but necessary to bring the water line of the target into alinement with the left hand image of the front horizon, as shown by the arrows in Fig. 6, thus, as before, measuring the angle EAD+DAF=FAE, the angle of depression of E.

A C, the height at which the stadimeter is to be set, is found as follows. Clearly it is nearly equal to A A', the height of the observer above the water; but it is not difficult to find it quite accurately. By formulas 235 and 239 of *Chauvenet's Astronomy*, Volume 1, $$\text{Tang } F' A'' E = \sqrt{\frac{2 A'' A'}{a}} =$$

$$.0784\sqrt{\frac{2 A'' A'}{a}} = .9216\sqrt{\frac{2 A'' A'}{a}}$$

$a$ being the radius of the earth in statute miles.
By *Chauvenet's Astronomy*, page 178, Volume 1, $$A'' E = \sqrt{2.3136 \times A'' A' \times a}$$

or $$a = \frac{(A'' E)^2}{2.3136 \times A'' A'} \quad (5)$$

substitute in (4)

$$\text{Tang } F' A'' E = .9216 \sqrt{\frac{2 A'' A'}{\frac{(A'' E)^2}{2.3136 A'' A'}}} \cdot .9216 \frac{\sqrt{4.6272(A'' A')^2}}{(A'' E)^2} = .9216 \times \frac{2.15 A'' A'}{A'' E} = 1.98 \frac{A'' A'}{A'' E} \quad (6)$$

But the tangent F'A'' E=(within allowable limits of error)

$$\tan A'' E C = \frac{A'' C}{A'' E},$$

therefore $$A'' C = 1.98 A'' A'. \quad (7)$$

Referring to the diagram (Fig. 7)

$$A C = A A' + A'' C - A'' A' = A A' + .98 A'' A'. \quad (8)$$

By formula 241 of *Chauvenet's Astronomy*, Vol. 1, $$\left(A'' A' \text{ (in feet)} = \frac{A' T \text{ (in statute miles)}}{1.317}\right)^2.$$

If the range A' T were two miles, or 3,520 yards, the correction would be $$.98 \times \frac{(2)^2}{1317} = 2.3 \text{ feet};$$

so that if the height of the observer above the water were 75 feet, the horizometer should be set at 77.3 feet on the scale 36.

In practice, I prefer to construct the apparatus as much as possible like the stadimeter. In the stadimeter the scale 36 has the 100 foot mark 4 inches from the pivot, 200 foot mark 2 inches from the pivot, and so on. The micrometer screw 37 is a 24 pitch screw. The screw 33 is as distant from the pivot 29, as is the object glass 2, therefore any vertical movement of the screw moves the glass an equal distance. In one actual instrument, the micrometer screw 21 is a 40 pitch screw, and focal length of the lenses 2 and 5 is 5.15 inches. The last graduation on the micrometer wheel 45 is 3200 yards.

By turning the micrometer wheel 45 through one revolution thus indicating 3200 yards, its point will be advanced 1/24 of an inch, and the object glass 2 will be lowered by an amount depending on the position of the screws 33 and 37. If they are opposite each other, the object glass 2 and its images on the focal plane will be moved 1/24 inch. In order to determine the correct position of the screw 33, which is permanent, the following calculation is made:

$$5.15'' \; 1/24'' = 3200 \times 3 \text{ feet} : X \text{ feet}$$

$$X \text{ feet} = \frac{9600}{24} \div 5.15$$

$$X = \frac{400}{5.15} = 77.7 \text{ feet}.$$

that is, the screw 33 should be placed at the mark of 77.7 feet on scale.

In place of the prisms 3 and 4 it is obvious that any other form of reflecting device may be employed. One other form of device for this purpose will be mirrors similar to those used upon the stadimeter and the sextant. If a mirror should be substituted for the prism 3, it could be of the same width as the prism so as to reflect but one-half of the image seen by the eye-piece, or could extend across the entire focal plane, but with one-half of its surface silvered and the other one-half unsilvered.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means. It is obvious, for instance, that the lens 5 could be moved instead of the lens 2, in order to aline the images of the two horizons.

Having now described my invention, what I claim and desire to secure by Letters Patent, is:

1. In a range finder, the combination with means for simultaneously observing direct and reflected images of the horizon of means for displacing the image of the target through the angle of the dip, and means for measuring the angle between the front or rear horizon and a previously displaced image of the target, thereby measuring the angle of depression of the water line of said target.

2. In a range finder, the combination with means for observing the horizon, by means of a reflected image, and means for observing the horizon by a direct image, means for observing both images simultaneously, the direct observation means including an object lens, and means for moving the lens to measure the angular distance between the direct and reflected images.

3. In a range finder, the combination with an eye-piece, and an object lens, of means for reflecting an image from the back, whereby simultaneous observations of the horizon at the front and back can be secured, and means for moving the object lens for measuring the angular distance between the direct and reflected images.

4. In a range finder, the combination with an eye-piece, and an object lens for securing a direct observation of a reflecting device for securing a reflected observation, two images being simultaneously observable to the eye-piece, and means for moving the object lens to bring the two images into alinement.

5. In a range finder, the combination with an eye-piece, of a reflecting means for observing an image in the front or rear, an objective lens for taking a direct observation. in front, and means for moving the objective lens perpendicular to its axis.

6. In a range finder, the combination of an eye-piece, a reflecting means for observing an image at the front or rear, an objective lens for observing an image by direct observation at the front, and means for moving the objective lens, such means comprising a pivoted lever engaging with the objective lens on one side of the pivot and engaging with a lever on the other side of the pivot, such lever being moved by a micrometer screw which is carried in an adjustable bearing.

7. In a range finder, the combination of an eye-piece, a reflecting means, an object lens, a pivoted lever, carrying the object lens on one side of the pivot and engaging with a second lever on the other side of the pivot, a traveling carriage, a micrometer screw carried thereby, and means for engaging the screw with the second lever.

8. In a range finder, the combination with an eye-piece and an object lens, of a reflecting means, said reflecting means being adjustably mounted so that it may reflect an object from the front or back.

9. In a range finder, the combination of an eye-piece, a pivoted lever, an objective lens mounted on one end of the pivoted lever and means including a micrometer screw engaging the other end of the pivoted lever for moving the objective lens perpendicular to its axis.

10. In a range finder, the combination with a central member, of a prism within the central member, the said prism occupying a portion of the width of the focal plane, an eye-piece, a vertical extension on the central member carrying a second prism, an object glass, a lever carrying the object glass, means for adjusting the position of the object glass in relation to the lever, a second lever, a connection between the two levers, a micrometer screw, the bearing for the screw being adjustable in relation to the second lever, and a connection between the screw and the second lever.

This specification signed and witnessed this 8th day of March, 1906.

BRADLEY A. FISKE.

Witnesses:
LEONARD H. DYER,
AUG. LONG.